United States Patent [19]

Minakawa et al.

[11] Patent Number: 4,682,003
[45] Date of Patent: Jul. 21, 1987

[54] LASER BEAM GLASS CUTTING

[75] Inventors: Takao Minakawa, Chiba; Shigeo Shiono, Ibaraki; Junichi Nishihashi, Tokyo, all of Japan

[73] Assignee: Sasaki Glass Co., Ltd., Tokyo, Japan

[21] Appl. No.: 810,187

[22] Filed: Dec. 18, 1985

[30] Foreign Application Priority Data

Apr. 3, 1985 [JP] Japan ................. 60-69014

[51] Int. Cl.⁴ ............................. B23K 26/00
[52] U.S. Cl. ....................... 219/121 LN; 65/104; 65/113; 219/121 LG
[58] Field of Search ............. 219/121 LG, 121 LN, 219/121 L, 121 LM; 65/104, 109, 112, 113, 120

[56] References Cited

U.S. PATENT DOCUMENTS

| | | | |
|---|---|---|---|
| 3,107,161 | 10/1963 | Bivens et al. | 65/120 X |
| 3,188,190 | 6/1965 | Armstrong | 65/120 X |
| 3,510,287 | 5/1970 | Panczner | 65/113 |
| 3,511,626 | 5/1970 | Wynn | 65/112 X |
| 3,706,543 | 12/1972 | Thuler | 219/121 LN X |
| 3,711,908 | 1/1973 | Broers | 219/121 EG X |
| 3,839,005 | 10/1974 | Meyer | 65/112 |
| 4,185,419 | 1/1980 | Ilk | 65/113 X |
| 4,468,534 | 8/1984 | Boddicker | 65/112 X |

FOREIGN PATENT DOCUMENTS 0177896 11/1982 Japan ................. 219/121 LN

Primary Examiner—C. L. Albritton
Attorney, Agent, or Firm—Cushman, Darby & Cushman

[57] ABSTRACT

In a laser beam glass cutting method, a glass article to be cut (for example a moulded tumbler having a moil) is maintained at a high temperature below the softening point of the glass and then the glass is repeatedly irradiated with a laser beam along the required cut-off line by rotating the glass. During this step, a tensile force is applied by gravity or by a mechanical device to the part to be cut off. Following removal of the part, the edge of the glass is irradiated again with the laser beam to effect fire-polishing thereof, so as to improve the shape of that edge. During the irradiation by the laser beam, an auxiliary inert gas is blown into the glass article to prevent glass deposition.

9 Claims, 6 Drawing Figures

LASER BEAM GLASS CUTTING

FIELD OF THE INVENTION

The present invention relates to a method of cutting glass using a laser beam.

DESCRIPTION OF THE RELATED ART

When a hollow glass product, such as so-called glassware, is to be manufactured by a blow-moulding using a paste mould or iron mould, an unnecessary part called a moil will be generated, and the moil must be cut off in order to complete the article. One method for cutting off the moil is the burn-off method, in which the glassware is heated in a ring-shaped burner between the moulding step and an annealing process, to melt the glass so as to cause the moil to drop under gravity so removing the same. The crack-off method is also used, in which the glassware is subjected to an annealing process with its moil still present, and then a scribed line is made therearound with a diamond, whereafter a gas burner flame is played on the region of the scribed line to subject that region to thermal shock. This causes the moil to crack off, and after polishing the cut edge with an abrasive, the edge is heated to the melting point by a gas burner flame to perform a fire polishing step, to smooth the cut-off plane while retaining as much as possible the shape of the edge. The former method is mainly used in connection with mass production moulding, while the latter method is used for mouth-blown wares.

Recently, demands in the marketplace have been made for glassware with cut-off edge shapes similar to those obtained by crack-off moil removal methods, and these have given rise to methods where most of the moil is removed by the burn-off method and then the glassware is subjected to a crack-off method following an annealing step, fully to remove the moil and to give the cross-sectional shape of the cut-off edge a similar finish to that afforded by the crack-off method. The cross-sectional shape of the edge will be approximately rounded in the case of the burn-off method, but more rectangular in the case of the crack-off method.

The manufacture of glassware using the crack-off method requires complicated machinery and so there are various problems with its operation, maintenance, supply of replacement parts and repair. Considerable labor is necessary to adjust the machinery to produce a finished product of a given size, so increasing the production costs and lowering the yield.

Another known method for removing a moil utilizes a laser beam for cutting the glassware. When the glassware to be cut is at a room temperature, as disclosed in Japanese Laid-Open patent application No. 57-209838 (U.S. application Ser. No. 249854 filed Apr. 1, 1981), a laser beam is projected on to the glassware surface while relatively moving the laser beam along that surface, so vaporizing the glass for a certain portion of its thickness while the remaining thickness portion thereof is heated to a temperature above its annealing temperature. In this way, the glassware may be cut to have a smooth cut-off surface along a desired line without being broken by the thermal shock derived from the laser beam irradiation. At the same time, a gas jet is directed towards the focal point of the laser beam, thus blowing away and removing the molten glass so that the laser may cut through the total thickness. This method requires such factors as the laser beam energy, the relative shifting speed of the laser beam and the glass surface, the thickness of the glassware and so on to be precisely and stably controlled; consequently, though it is effective for sheet glass having a uniform thickness, it is difficult to effect perfect cutting of hollow glassware having a varying thickness along the cut-off line. As a result, it is necessary to blow away from within the glassware the molten glass which has been blown off by the gas jet, so that the molten glass will not adhere to the inner surface of the glassware. This laser cutting method has such problems that its field of application is considerably limited, and it is not an entirely satisfactory cutting method.

In the laser cutting method disclosed in Japanese patent publication No. 46-24989 (U.S. application Ser. No. 691883 filed Dec. 19, 1967)), there is the problem that the cutting sometimes occurs in an unexpected direction because of breakage deriving from the thermal shock of the laser beam irradiation, and also the cut-off edge will have a notched uneven surface, thus requiring subsequent polishing in the case of glassware. On the other hand, in a case when the glass product is preheated to a temperature close to its softening point, as disclosed in Japanese Patent Publication No. 54-8487 (U.S. Pat. No. 3,885,943), if the target area of the laser beam on the glass surface is too small, the glass may locally be cut off but the cut-off parts are likely to fuse together again: therefore, the relative shifting speeds of the laser beam and the glass surface have to be corelated to the laser energy and the thickness of the glass product. Fusion of the cut parts is thus a problem if the operation conditions are not precisely uniform, and also air bubbles may be trapped at the cut part, so creating a quality defect. Therefore, this method also is not satisfactory for producing glassware.

OBJECT AND SUMMARY OF THE INVENTION

A principal object of the present invention is to provide a method of cutting glass using a laser, usually a $CO_2$ laser, in such a manner that the cutting can be completed in a short period of time and at the same time a desired profile for the cut-off edge can be obtained.

Accordingly, this invention provides a method of cutting glass using a laser beam to effect local heating of the glass, in which the region of the glass to be cut is maintained at a high temperature below the softening point of the glass, the glass is then repeatedly irradiated with a laser beam along the required cut-off line while a tensile force is applied to the part to be cut off. Following removal of that part, the glass is irradiated again with the laser beam to effect "fire-polishing" thereof. The term "fire-polishing" used herein means repeated irradiation of the cut-off plane with a laser beam after the moil has dropped to obtain an even surface by surface tension.

In this invention, the laser beam raises the temperature on the cut-off line to above the fluidizing temperature, and the applied tensile force to the cut-off region by gravity or in a forced manner thus rapidly effects cutting off. The irradiation of the cut-off line with the laser beam is continued to re-heat the same, so that a cutting surface which is close to a rectangular shape or a round shape can selectively be obtained, while giving a smooth edge.

When performing the method of this invention, it is most preferred for an auxiliary gas stream to be directed to the region to be cut during the laser irradiation thereof, and in the case of the manufacture of an article of hollow glassware (such as a tumbler), that auxiliary gas stream advantageously is directed into the interior of the glassware at least during irradiation thereof by the laser beam. In this way, whitening of the glassware surface by deposition of vaporized glass can be prevented, and also the gas stream may serve to assist the production of the required profile at the cut edge.

A gas burner advantageously is used to heat the cut-off region during the laser irradiation thereof, to assist the cutting operation. Further gas burners may be used to pre-heat the glass to a high temperature before irradiation and to minimize thermal shock following completion of the cutting step.

Especially when producing an article of hollow glassware, the glass to be cut may be held in a rotatable chuck and during laser irradiation the glass is rotated. In this way, the cut-off region will repeatedly be subjected to irradiation by the laser beam, until cut-off is completed.

DETAILED DESCRIPTION OF THE PREFERRED EMBODIMENT

By way of illustration of this invention, specific examples thereof will now be described in detail, reference being made to the accompanying drawings.

Figure 1:
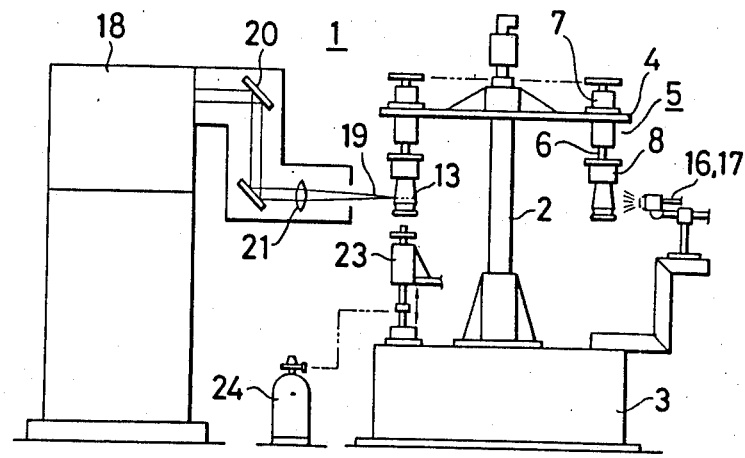
FIG. 1 is a schematic cross-sectional side view of a laser beam glass cutting device arranged to perform the method of this invention.
Figure 2:
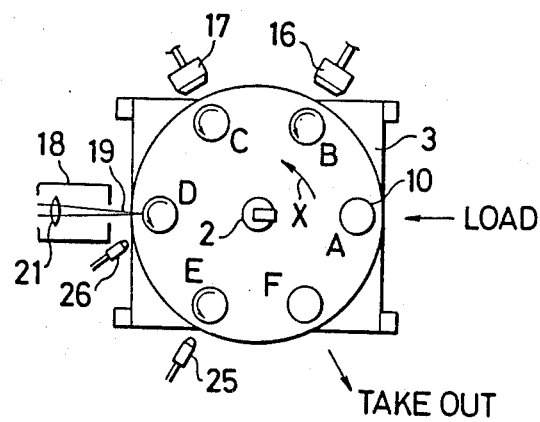
FIG. 2 is a schematic plan view of part of the laser beam glass cutting device of FIG. 1.

The laser beam glass cutting device 1 shown in FIG. 1 comprises a main shaft 2 supported at its lower end by a mounting stand 3, the shaft 2 being coupled to a suitable device (not shown) within the mounting stand 3 to effect the intermittent rotation thereof. The upper end of the shaft 2 is coupled to a turntable 4, the arrangement being such that the shaft 2 may intermittently be rotated by the device within the stand 3, thereby effecting intermittent rotation of the turntable 4 in the counterclockwise direction X, as shown in FIG. 2. The turntable 4 has a plurality of glass-holding parts 5 positioned thereon.

Figure 3:
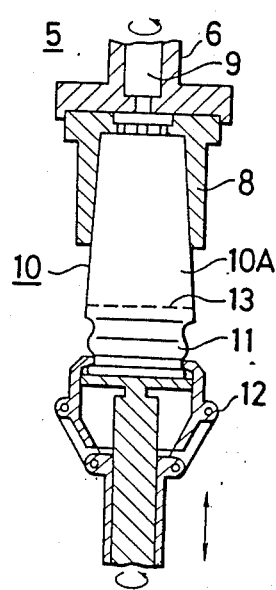
FIG. 3 is a side elevation view of a glass holding part as used in the device of FIG. 1.

Each glass holding part 5 has an auxiliary shaft 6 provided with an auxiliary rotation driving part 7 (for example an electric motor) mounted on the turntable 4, so that the shaft 6 may be rotated in the same sense as the turntable 4—i.e. counterclockwise as viewed in FIG. 2. The lower end of the auxiliary shaft 6 has a vacuum chuck 8 assembled thereon, which vacuum chuck 8 is exhausted or supplied with air by a vacuum pump (not shown) through a flow path 9 extending through the auxiliary shaft 6, as shown in FIG. 3. In this way, a glass may be held by the chuck or released therefrom.

The glass 10 has its upper end—that is, the bottom of the glass (or tumbler) to be manufactured—held by the vacuum chuck 8, while the lower end of the glass forms a moil 11. The moil 11 is to be separated at the cut-off line 13 and may drop naturally immediately after cutting, or may be cut off while being pulled downwards by a moil chuck 12 using, for example, hydraulic or air pressure or spring means.

A description will now be given of a case where a glass (tumbler) 10A is to be completed from a glass 10 having a moil 11 present, the moil 11 being removed by the glass cut-off device 1 as shown in FIGS. 1 and 2.

The glass 10, having an opening diameter of 60 mm, an upper wall thickness of 1.4 mm and having a moil 11 still present, is annealed and is mounted on the device 1 at an initial position A (FIG. 2). The bottom plane of the glass 10 faces upwardly and is held in position by the vacuum chuck 8.

The main shaft 2 is then moved to cause the turntable 4 to advance one step in the counterclockwise direction X, so that the glass 10 with its moil 11 is brought to the pre-heating position B. At the same time, the auxiliary shaft 6 is rotated, in the same counterclockwise direction X. Another glass 10 may now be mounted on the vacuum chuck 8 then present at the initial position A.

Mounted on the stand 3 are pre-heating burners 16 and 17, disposed to heat glasses 10 present respectively at pre-heating positions B and C, in the regions of those glasses 10 where the moil 11 is to be cut off, about cut-off line 13. A glass 10 is thus preheated at position B, and after a further stepwise advance of the turntable 4 is preheated again at position C up to about 500° C., the glass 10 being rotated during the heating. Burner 17 should bring the glass temperature up to around but below the softening point of the glass material.

Figure 4:
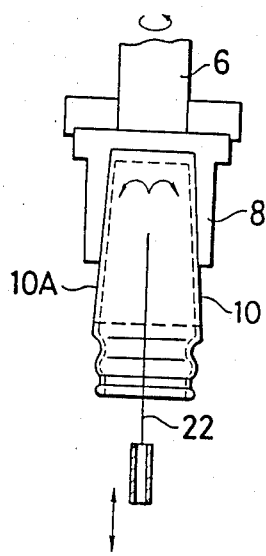
FIG. 4 is a further side elevation view of the glass holding part.

A further stepwise advance of the turntable 4 brings the heated glass 10 to the laser beam position D. A laser beam generation device 18 provides a laser beam 19 which is reflected by mirrors 20 and passes through a condenser lens 21, the beam 19 being directed to the cut-off line 13 between the glass 10A and moil 11. The glass 10 is rotated at about 500 rpm and still retains heat from the previous steps while being irradiated with the laser beam 19. The temperature of the glass 10 with moil 11 will be raised locally further to above the fluidizing temperature of the glass 10 by the laser irradiation typically for about 3 seconds, whereafter the moil 11 drops under gravity. In this way, a finished glass 10A is obtained. At this time, by blowing auxiliary gas 22 (0.5 litres/m, 2 kg/cm$^2$, 20° C.) as shown in FIG. 4, into the glass 10 in the direction shown by the arrows, while the moil 11 is still present, a smooth cut-off plane can be obtained and whitening due to evaporation deposition is prevented. Conveniently, the auxiliary gas 22 is supplied from a cylinder 24 through a nozzle 23 supported by the mounting stand 3 in such a way that the nozzle 23 can be moved up and down. The auxiliary gas 22 may be any suitable inert gas the temperature of which should be below the softening point of the glass 10.

The cut-off plane 13A of the glass 10 may be finely uneven, but by heating the cut-off line 13 with the laser beam 19 for about 1 second after the moil 11 has dropped to "fire-polish" that edge and at the same time continuing auxiliary gas blowing, such unevenness can be eliminated. In this way, the cut-off plane 13A can be made smooth. Also, along with the irradiation with the laser beam 19, an area around the cut-off plane 13A can be heated with a burner 26 for accelerating smoothing of the cut-off plane 13A.

The finished tumbler 10A is taken to the next position E on a further advance of the turntable 4, where thermal stress is reduced by a burner 25, and on the next advance the glass 10A is rotated to a take out position F. Here, the glass (tumbler) 10A with a desired cut-off plane 13A is removed from the apparatus. It will be appreciated that each time the turntable 4 stops, a glass 10 with moil 11 is mounted on a chuck 8 for the time being at the initial position A, and at the same time a completed glass 10A is removed from the take out position F.

The cut-off region of the glass 10 with moil 11 is heated by burners 16 and 17 to about 500° C. to 700° C. in this manufacturing process, before laser irradiation. That region is then irradiated with the laser beam 19, and the cut-off part 13 of the glass 10 with its moil 11 still present has heat retained therein, so that the moil 11 is easily separated without generating cracks or deformations in the glass 10. At the same time, a well-formed cut-off plane 13A for the finished glass 10A can be produced.

It will however be appreciated that if the cut-off region of the glass 10 with moil 11 still present is at a high temperature, even if below the softening point, by virtue of heat retention from some preliminary process, then preheating of the glass 10 with moil 11 by the burner 16 and perhaps the burner 17 as well may be omitted. The heating of the finished glass 10A by gas burners 25 and 26, after irradiation with the laser beam 19, for heating and smoothing the cut-off part after separating the moil 11, may also be omitted when there is no possibility of the generation of cracks and deformations.

Figure 5A:
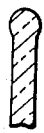
FIGS. 5(a) and 5(b) are schematic side elevations showing the end planes of glass openings as produced by a prior art process and a process of the present invention, respectively.
Figure 5B:
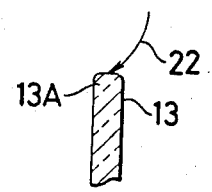

When the glass 10 with moil 11 is irradiated with a laser beam 19 in the described process, the auxiliary gas 22 is blown into the glass 10 with moil 11 at the same time as the irradiation. Deposition of very fine particles of glass, which are generated at the time of irradiation, can in this way be prevented on the inner surface of the glass 10A. Also, if the inner and outer planes of the glass 10 are heated with gas burners, whitening due to evaporation deposition can be prevented. In addition, as a result of the auxiliary gas 22 being blown onto the cut-off plane 13A, as shown in FIG. 5(b), the formation of a rounded shape in the prior art as shown in FIG. 5(a) due to surface tension at the time of melting can be prevented. The gas blowing thus serves to make the cut-off plane 13A even smoother.

In the just-described process, the cut-off line 13 is subjected to tension as a result of gravitational forces acting on the moil 11 while the glass 10 is rotated and irradiated with the laser beam 19. The tension can instead be mechanically generated, using a moil chuck 12 as illustrated in FIG. 3, the process otherwise proceeding as described. In either case it is possible to obtain a shortening of the time required for cutting by virtue of the tensile force applied to the cut-off line 13 of the glass 10 during laser beam irradiation. While the conventional prior art depended on evaporation of the cut-off part and the surface tension of the molten glass 10, the application of a tensile force to the molten glass 10 at the cut-off line 13 facilitates the cutting (separation), thus enabling a shortening of the time required for cutting.

The above description has referred to a manufacturing process in which the turntable 4 is rotated intermittently and has a plurality of glass-holding parts 5 positioned in a ring. Instead, the preheating burners 16 and 17, the laser beam apparatus 18 and the reheating burners 25 and 26 may be positioned in the proper order from the initial position A to the take out position F along a linear conveyor suitably driven for performing the same process as discussed above.

While the described process related to a case in which the cut-off surface has a shape close to a rectangular shape, it is easy to obtain a rounded cut-off plane shape, the prior art is shown in FIG. 5(a), if desired. For example, it can be done by controlling the heating conditions of the cut-off plane of the glass by such means as an increase in an irradiation time of the laser beam 19 after cut-off has been completed, or strengthening of the gas burner heating which is done along with the irradiation.

The present invention can be utilized for various kinds of articles besides table-ware such as glasses, and so on. For instance, it may be used for glass members having relatively thin wall thicknesses, such as a tubular body, a sheet material, a bottle, a laboratory vessel, lighting glass and so on.

It will be appreciated that in the examples of glass cutting methods of this invention as described above, the glass articles can be cut in a shorter time than before and at the same time a cut-off plane with a desired shape having a smooth surface can be easily obtained.

We claim:

1. A method of fusion cutting glass using a laser beam to effect local heating of the glass, in which method the region of the glass to be cut is maintained at a high temperature below the softening point of the glass, the glass is then repeatedly irradiated with a laser beam to be fused along a required cut-off line while a downwardly directed tensile force is applied to a part to be cut off so that a rectangularly shaped cut edge is obtained.

2. A method of cutting glass according to claim 1, in which following removal of that part the edge of the glass is irradiated again with the laser beam to effect fire-polishing thereof.

3. A method of cutting glass according to claim 1, in which an auxiliary gas stream is directed to the region to be cut during the laser irradiation thereof.

4. A method of cutting glass according to claim 1, in which a gas burner is used to heat the cut-off region during the laser irradiation thereof.

5. A method of cutting glass according to claim 1, which method is performed such that gravitational forces acting on the glass part to be cut-off apply said tensile force to the cut-off region during laser irradiation.

6. A method of cutting glass according to claim 1, in which the glass to be cut is held in a first holding device, the part to be cut-off is held in a second holding device, and during laser irradiation a relatively separating force is applied to the two holding devices thereby to apply a tensile force to the cut-off region.

7. A method of cutting glass according to claim 1, in which the glass to be cut is held in a rotatable chuck and during laser irradiation the glass is rotated thereby repeatedly subjecting the cut-off region of the glass to irradiation by the laser beam.

8. A method of cutting glass according to claim 1, in which an article of hollow glassware is subjected to the laser cutting operation so as to remove therefrom the moil produced during the glass blowing operation.

9. A method of cutting glass according to claim 8, in which an auxiliary gas stream is directed into the interior of the glassware at least during the irradiation thereof by the laser beam.

* * * * *